United States Patent [19]

Carr et al.

[11] Patent Number: 5,291,284

[45] Date of Patent: Mar. 1, 1994

[54] PREDICTIVE CODING AND DECODING WITH ERROR DRIFT REDUCTION

[75] Inventors: Michael D. Carr; David G. Morrison, both of Ipswich, England

[73] Assignee: British Telecommunications, London

[21] Appl. No.: 730,887

[22] PCT Filed: Dec. 12, 1989

[86] PCT No.: PCT/GB89/01483

§ 371 Date: Jul. 23, 1991

§ 102(e) Date: Jul. 23, 1991

[87] PCT Pub. No.: WO90/07246

PCT Pub. Date: Jun. 28, 1990

[30] Foreign Application Priority Data

Dec. 13, 1988 [GB] United Kingdom ............ 8829063

[51] Int. Cl.⁵ ............................................. H04N 7/13
[52] U.S. Cl. ................................. 348/415; 375/27
[58] Field of Search ............... 358/136, 13, 170, 171, 358/172; 375/27, 30, 33; 330/9; 341/76, 77, 143; 307/350, 353, 358; 328/151; H04N 7/137

[56] References Cited

U.S. PATENT DOCUMENTS

| | | | |
|---|---|---|---|
| 2,820,181 | 1/1958 | Bowman et al. | 358/139 X |
| 4,317,208 | 2/1982 | Araseki et al. | 375/27 |
| 4,377,759 | 3/1983 | Ohhata et al. | 328/162 X |
| 4,542,516 | 9/1985 | Weirich | 375/30 |
| 4,549,304 | 10/1985 | Weirich et al. | 341/77 X |
| 4,593,398 | 6/1986 | Millar | 375/27 |
| 4,727,422 | 2/1988 | Hinman | . |
| 4,859,883 | 8/1989 | Bradinal | 328/162 X |
| 4,950,929 | 8/1990 | Yan | 330/9 X |
| 5,030,858 | 7/1991 | Sekiya | 330/9 X |

FOREIGN PATENT DOCUMENTS 0235803 9/1987 European Pat. Off. .
2173067 10/1986 United Kingdom .

OTHER PUBLICATIONS

IEEE Transactions on Communications, vol. COM-31, No. 3, (Mar. 1983), IEEE, (New York, US), R. Wilson et al. "Anisotropic nonstationary image estimation and its applications: Part II–Predictive image coding", pp. 398–406.

IEEE Transactions on Communications, vol. COM-21, No. 6, (Jun. 1973), IEEE, (New York, US), J. P. Agrawal et al. "Low bit rate differential PCM for monochrome television signals", pp. 706–714.

Proceedings of the Instituion of Electrical Engineers, vol. 124, No. 9, (Sep. 1977), J. A. Kitchen et al. "Subjective effects of d.p.c.m. errors and predictor leak on visual telephone pictures", pp. 737–741.

IEEE Transactions on Communications, vol. COM-29, No. 12, (Dec. 1981), IEEE, (New York, US), D. E. Troxel "Applicatin of pseudorandom noise to DPCM", pp. 1763–1767.

Primary Examiner—Victor R. Kostak
Attorney, Agent, or Firm—Nixon & Vanderhye

[57] ABSTRACT

A predictive coder, e.g., a hybrid DCT interframe predictive video decoder, reduces the tendency of long-term bias error in the decoded difference signal to accumulate in a predictor (7) by periodically alternating the polarity of the bias error relative to the contents of the predictor. Inverse discrete cosine transform (IDCT) stage (6) in a receiver is bracketed by switchable invertors (9a, 9b) which, when operating, invert the signal into IDCT stage (6) and then reinvert the signal, plus error, out of IDCT stage (6), thereby inverting the error relative to the difference signal. Control means (10), e.g., a pseudo-random number generator, switches the invertors (9a, 9b) in and out periodically such that, over several frames, each block spends an equal amount of time in "normal" and "inverted" modes.

22 Claims, 1 Drawing Sheet

# PREDICTIVE CODING AND DECODING WITH ERROR DRIFT REDUCTION

BACKGROUND

I. Field of the Invention

The invention relates to predictive coding and decoding and particularly, but not exclusively, to an interframe video coding system employing transform coding.

II. Prior Art and Other Considerations

In a predictive encoding scheme, the receiver constructs a prediction of what the present value of a signal will be based upon its past values. Such schemes therefore generally employ a delay or store stage termed a predictor, which supplies past signal values (possibly weighted) to form a prediction of present signal values.

At the transmitter, a similar prediction is performed, and the difference between the predicted signal values and the actual signal values is encoded and transmitted as a difference signal to the receiver where it is added to the prediction to reconstitute an approximation of the actual signal.

Such systems may be analogue or digital; an example of a digital system is a digital video encoding system.

Video data is highly redundant, and it is therefore known to transmit video data employing an interframe predictor, which may also compensate for motion between frames. At the transmitter end of such a system, the difference signal values may be coded, in blocks of, for example, 8×8 picture elements (pixels), employing a spatial transform, and at the receiver the inverse transform is applied to decode the difference signal.

A commonly used transform is the Discrete Cosine Transform. The mathematical operations needed to perform it cannot be expressed exactly with a finite number of bits. Therefore practical implementations with different internal computing architectures produced, for example, by different manufacturers, can give slightly different results.

An inverse transform stage is located in both the coder and decoder. If these two do not produce exactly the same difference signal values at their outputs then the predictions at the encoder and decoder begin to diverge, and the resulting error becomes visible on the decoded picture.

This problem is tackled by specifying the maximum allowable error with respect to a (notional) very accurate version of the inverse transform.

Tests indicate that the two mean error parameters (the mean error on any pixel, and the mean error overall) are very important as they reflect bias, the presence of which results in a cumulatively increasing divergence between the pictures at the coder and decoder. The overall mean error thus becomes visible, as a steadily increasing or decreasing brightness of a picture block over many frames, or as an increasing colour cast.

Analogous problems occur in coding systems for other types of data (e.g. speech).

SUMMARY

According to one aspect of the invention, there is provided a predictive decoder comprising means for supplying a difference signal, means for supplying a prediction signal, and means for combining the said two signals to form an output signal dependent thereon, the prediction signal being derived from the output signal so as to depend upon previous portions of the difference signal, characterised in that means are provided for periodically alternating the operation of the decoder between first and second states, in which the cumulative effect of any time-averaged bias present in the difference signal is, respectively, to increase and to deplete the prediction signal, the respective lengths of the periods spent in the first and second states being such as to reduce the tendency of such time-averaged bias error to accumulate in the prediction signal.

This has the advantages of reducing long-term perceptually significant errors in the decoded signal, and thereby requiring lower precision, or granting greater error-immunity in the decoder.

According to other aspects, defined in the sub-claims, corresponding transmitters and systems, and a digital signal processing device useful therein, are provided.

In a preferred embodiment, particularly useful in block transform coding video systems, this invention reduces the mean errors by inverting the polarity of the data into and out of the inverse transform stage at intervals such that any bias is averaged out over a period of time. The periods of inverted and non-inverted operation are preferably substantially equal on average.

Each such block of the picture must, over a period of several successive frames, be subject to both normal and inverted operation. For some coding schemes it may be possible to use alternate modes on alternate frames. However, some coders utilise frame dropping methods, and in these there could be correlation between the coding frame rate and the inversion rate such that the number of times each part of the picture used the normal and inverted modes of the inverse transform would not be substantially equal.

A random or pseudo-random generator is therefore preferably used to control the mode of the inverse transform.

An advantage of the invention is that this inverted mode is internal to the decoding operation and does not affect the data outside it. The technique may therefore be used at either of the coder or the decoder, or both, and no overhead signalling of normal/inverted mode is required.

BRIEF DESCRIPTION OF THE DRAWINGS

The invention will now be illustrated, by way of example only, with reference to the accompanying drawings, in which.

DETAILED DESCRIPTION OF THE DRAWINGS

Figure 1:
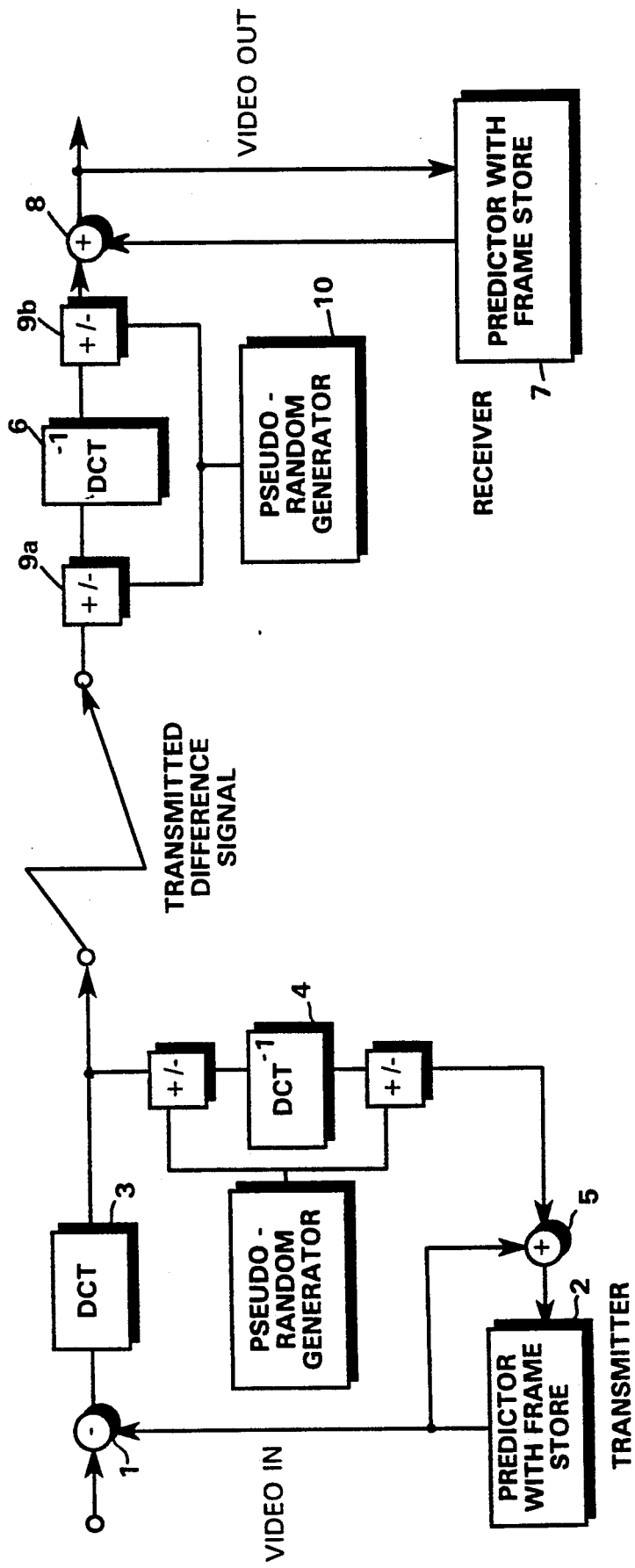
FIG. 1 is a simplified block diagram of an interframe hybrid DCT encoding transmission system according to one aspect of the invention.

Referring to FIG. 1, the transmitter end of an interframe predictive video coder receives a video input signal. A subtraction stage 1 subtracts from the input an estimate of what the decoder will predict the input to have been; this estimate is supplied by a predictor 2, comprising a frame store. The difference signal is encoded by a DCT transform stage 3, in 8×8 blocks of pixel interframe samples, and the resulting transform coefficients corresponding to the encoded difference signal are transmitted to the receiver. The contents of the predictor 2 are updated, by supplying the transform coefficients to an inverse transform stage 4, which reconstitutes the difference signal. This is added to the fed-back current contents of predictor 2 in addition stage 5 and the result stored as an updated prediction by predictor stage 2.

These latter stages correspond to the operation of the receiver, where received transform coefficients are inverse transformed in an inverse transformation stage 6 to reconstitute the interframe difference signal which is added to the prediction signal supplied by interframe predictor 7 in addition stage 8, and the resultant reconstituted video is output for display or further processing, and is stored in predictor 7.

Typically, a quantizer will be included at the transmitter following the transform stage 3, and corresponding inverse quantizers preceding the inverse transform stages 4, 6 at either end; these have been omitted for clarity from FIG. 1.

This much of the invention is disclosed in, for example, our previous UK patent applications 8716195 and 8722394.

A problem arises if the operation of a component (for example the inverse transform stage 6) in the signal path at the receiver generates a mean error different from that correspondingly generated in the local decoding stages at the transmitter. To compensate for the cumulative picture error generated, there are therefore provided in the receiver (and/or the local decoder stages in the transmitter) means for selectively inverting the difference signal prior to the error-generating stage, so that during inverted operation the sign of the error relative to the signal is reversed; referring to FIG. 1, one simple method is to provide a pair of switchable invertors 9a, 9b under control of control means 10, bracketing the error-generating (inverse transform) stage 6, so that after re-inversion the transformed signal is of the correct sign but the bias mean error is inverted.

Another method of performing the invention retains invertor 9a upstream of the error-generating stage 6, but instead of positioning invertor 9b upstream of addition stage 8, two further invertor stages are provided; one between addition stage 8 and the output, and one between predictor 7 and addition stage 8; one skilled in the art will appreciate that the result obtained in this case is mathematically equivalent to that shown in FIG. 1. Conveniently, to replace invertor 9b or the two invertors described above, addition stage 8 could be controlled by alternately adding or subtracting the difference signal to or from the predictor signal under the control of control means 10; this reduces the number of mathematical operations involved.

However, it may equally be convenient to implement invertors 9a and 9b (and possibly control means 10) as part of a single digital signal processing (DSP) device with inverse transform stage 6; such a stand-alone device could then simply be a pin-compatible, 'invisible' replacement part.

If the error generating stage 6 is a digital arithmetic unit employing stored constants (for example, an inverse transform stage), an alternative embodiment of the invention provides alternate sets of such stored constants, such that the operation of the stage 6 when employing one set generates a mean error of opposite sign to its operation when employing the other, and the control means 10 in operation alternates periodically the sets employed.

It will be understood that in digital systems, invertor stages 9a, 9b are easily realised without multiplication. In signed binary systems, for example, the invertor merely needs to invert the state of the leading bit (e.g. by performing an exclusive-OR operation with a logical control signal from control means 10).

Control means 10 in a first embodiment simply operates as a bistable counter, alternating the operation of invertors 9a and 9b between inactive and inverting conditions at regular, preferably equal intervals (although, if the magnitude of the mean error in one state is known to be unequal to that in the other, the ratio of the intervals in each state will be made equal to the ratios of the magnitudes).

In another embodiment, useful in encoding video systems utilising frame dropping methods, the control means 10 employs a pseudo-random number generator, producing periods in each mode of equal length when averaged over time.

The technique is equally applicable to dedicated hardware devices (principally to digital devices, but in principle to analogue devices also), and to general purpose or dedicated computers operating under stored program control.

We claim:

1. A predictive decoder comprising means for supplying a difference signal, means for supplying a prediction signal, and means for combining the said two signals to form an output signal dependent thereon, the prediction signal being derived from the output signal so as to depend upon previous portions of the difference signal, characterised in that means are provided for periodically alternating the operation of the decoder between first and second states, in which the cumulative effect of any time-averaged bias present in the difference signal is, respectively, to increase and to deplete the prediction signal, the respective lengths of the periods spent in the first and second states being such as to reduce the tendency of such time-averaged bias error to accumulate in the prediction signal.

2. A decoder according to claim 1 in which the means for supplying a difference signal is operable to generate the difference signal by performing a digital arithmetic operation upon input data received by the decoder using stored digital constant values, and the decoder includes means for inverting the polarity of the input data relative to the digital constant values in one of said states.

3. A decoder according to claim 2 in which the means for inverting operates to invert the digital input data prior to the said digital arithmetic operation.

4. A decoder according to claim 2 in which the means for inverting operates to invert at least one of the stored digital constant values.

5. A decoder according to claim 2, in which the means for inverting is connected to employ at least one different stored digital constant in each state.

6. A decoder according to claim 2 in which the means for supplying a difference signal is arranged to perform an inverse transformation operation.

7. A decoder according to claim 1 arranged to supply as an output signal a video signal.

8. A decoder according to claim 7, in which the means for supplying a prediction signal is a frame store connected to receive the output signal.

9. A decoder according to claim 1 further comprising means for controlling the alternation between the said states so that successive periods in a given state are not all of equal length.

10. A decoder according to claim 9, in which the means for controlling the alternation is a pseudo-random number generator.

11. A predictive encoder for producing a coded signal for transmission, including a decoder according to claim 1 connected to receive the coded signal, the coded signal being produced in dependence upon the difference between the encoder input and the prediction signal.

12. A digital signal processing device comprising:
means for producing an output signal, the means for producing an output signal being operative in a first state and a second state, the time-average of any error in said output signal being of opposite sign in said first and second states, respectively, and
means for alternating the device between the first state and the second state, whereby alternating the device periodically between said first and second states reduces the long-term average value of the error in said output signal.

13. A device as claimed in claim 12 in which the means for producing an output signal comprises:
a predictive coder which includes means for supplying a series of difference signals;
means for supplying a series of prediction signals; and
means for combining respective ones of said difference signals and prediction signals to form a series of output signals, a given prediction signal being derived from a previous output signal so as to depend upon previous ones of said difference signals, and in which a cumulative effect of any time-average bias present in said difference signal is to increase and to deplete the prediction signal in said first state and second state, respectively;
the means for alternating the device between the first state and the second state being such that the respective lengths of the periods spent in said first and second states reduce the tendency of such time-average bias error to accumulate in said prediction signals.

14. A device as claimed in claim 13 in which the means for supplying a difference signal is operable to generate the difference signal by performing a digital arithmetic operation upon input data received by the device using stored digital constant values, and the device includes means for inverting the polarity of the input data relative to the digital constant values in one of said states.

15. A device as claimed in claim 14 in which the means for inverting operates to invert the digital input data prior to the digital arithmetic operation.

16. A device as claimed in claim 14 in which the means for inverting operates to invert at least one of the stored digital constant values.

17. A device as claimed in claim 14 in which the means for inverting is connected to employ at least one different stored digital constant in each state.

18. A device as claimed in claim 14 in which the means for supplying a difference signal is arranged to perform an inverse transformation operation.

19. A device as claimed in claim 12 wherein the output signal is a video signal.

20. A device as claimed in claim 13, in which the means for supplying a prediction signal is a frame store connected to receive the output signal.

21. A device as claimed in claim 12, further comprising means for controlling the alternation between the states so that successive periods in a given state are not all of equal length.

22. A device as claimed in claim 21, wherein the means for controlling the alternation is a pseudo-random number generator.

* * * * *